US005470556A

United States Patent [19]
Samish

[11] Patent Number: 5,470,556
[45] Date of Patent: Nov. 28, 1995

[54] METHOD FOR REDUCTION OF SULFUR TRIOXIDE IN FLUE GASES

[75] Inventor: Norman C. Samish, Houston, Tex.

[73] Assignee: Shell Oil Company, Houston, Tex.

[21] Appl. No.: 171,954

[22] Filed: Dec. 22, 1993

[51] Int. Cl.$^6$ ............... B03C 3/013; B03C 3/017; B01D 53/50; B01D 53/75

[52] U.S. Cl. ............... 423/243.08; 95/58; 95/60; 95/64; 95/65; 95/70; 95/71; 423/215.5; 423/243.01

[58] Field of Search ............... 423/210, 215.5, 423/243.01, 243.08, 244.08; 95/58, 65, 66, 67, 70, 71–72, 60

[56] References Cited

U.S. PATENT DOCUMENTS

| | | | |
|---|---|---|---|
| 3,851,042 | 11/1974 | Minnick | 423/244 |
| 3,976,747 | 8/1976 | Shale et al. | 423/244 |
| 3,985,119 | 10/1976 | Mc Ilvaine | 423/243.01 |
| 3,986,848 | 10/1976 | Howell | 95/64 |
| 4,047,891 | 9/1977 | Schuetz | 23/230 A |
| 4,061,716 | 12/1977 | McGauley | 423/244 |
| 4,233,175 | 11/1980 | Delmon et al. | 252/192 |
| 4,277,450 | 7/1981 | Dilworth | 423/244 |
| 4,330,512 | 5/1982 | Lindstrom | 423/244 |
| 4,387,078 | 6/1983 | Lin | 423/244 |
| 4,387,653 | 6/1983 | Voss | 110/342 |
| 4,555,390 | 11/1985 | Bhatia | 423/242 |
| 4,560,543 | 12/1985 | Caspersen et al. | 423/242 |
| 4,562,054 | 12/1985 | Bhatia | 423/244 |
| 4,581,210 | 4/1986 | Teller | 423/242 |
| 4,590,049 | 5/1986 | Staudinger | 423/244 |
| 4,609,536 | 9/1986 | Yoon et al. | 423/244 |
| 4,613,487 | 9/1986 | Yoon et al. | 423/244 |
| 4,645,652 | 2/1987 | Kimura | 423/235 |
| 4,645,653 | 2/1987 | Kimura | 423/235 |
| 4,726,940 | 2/1988 | Kobayashi | 423/240 |
| 4,788,047 | 11/1988 | Hamala et al. | 423/244 |
| 4,792,440 | 12/1988 | Nielsen et al. | 423/244 |
| 4,804,521 | 2/1989 | Rochelle et al. | 423/242 |
| 4,848,995 | 7/1989 | Samish | 62/20 |
| 4,861,568 | 8/1989 | Robinson, Jr. | 423/243 |
| 4,865,828 | 9/1989 | Lerner | 423/244 |
| 4,867,955 | 9/1989 | Johnson | 423/244 |
| 4,891,194 | 1/1990 | Kubisa et al. | 423/240 |
| 4,908,195 | 3/1990 | Wanner et al. | 423/239 |
| 4,915,920 | 4/1990 | Kobayashi | 423/239 |
| 4,919,696 | 4/1990 | Higashi et al. | 55/269 |
| 4,919,905 | 4/1990 | Horaguchi et al. | 423/239 |

(List continued on next page.)

FOREIGN PATENT DOCUMENTS

| | | |
|---|---|---|
| 3317504A | 11/1984 | Germany. |
| 3915934A | 11/1989 | Germany. |
| WO89/11329 | 11/1989 | WIPO. |

*Primary Examiner*—Gary P. Straub
*Attorney, Agent, or Firm*—Timothy J. Hadlock

[57] ABSTRACT

The invention is a method for reduction of sulfur trioxide in flue gases which includes (a) combusting air and petroleum coke in a combustion zone to produce a particulates, sulfur trioxide, and sulfur dioxide-containing combustion product gas; (b) passing the combustion product gas from step (a) to a dry electrostatic precipitator for removal of particulates and recovering the combustion product gas substantially free of particulates, or alternatively rearranging the steps so so that step "b" follows steps "c" and "d"; (c) admixing particulates with the combustion product gas from step (b), to produce a first mixture; (d) passing the first mixture from step (c) to an air preheater for cooling the first mixture and heating the air for combustion with the petroleum coke, wherein the sulfur trioxide in the first mixture condenses on the particulates, to produce a second mixture containing combustion product gas containing sulfur trioxide condensed on particulates and sulfur dioxide; (e) passing the second mixture from step (d) to a wet scrubber for removal of substantially all of the sulfur dioxide, sulfur trioxide, and particulates, to produce a combustion product gas substantially free of sulfur dioxide, sulfur trioxide, and particulates; and (f) passing the combustion product gas substantially free of sulfur dioxide, sulfur trioxide, and particulates from step (e) to a stack for release to the atmosphere.

13 Claims, 3 Drawing Sheets

U.S. PATENT DOCUMENTS

| | | | |
|---|---|---|---|
| 4,921,886 | 5/1990 | Ewan et al. | 423/235 |
| 4,931,264 | 6/1990 | Rochelle et al. | 423/242 |
| 4,956,162 | 9/1990 | Smith et al. | 423/244 |
| 4,980,138 | 12/1990 | Samish | 423/239 |
| 5,027,723 | 7/1991 | Landreth et al. | 110/343 |
| 5,084,256 | 1/1992 | McElroy et al. | 423/244 |
| 5,137,704 | 8/1992 | Eschenburg | 423/235 |
| 5,238,666 | 8/1993 | Janka | 423/244.07 |
| 5,246,680 | 9/1993 | Pikkujamsa | 423/244.07 |

METHOD FOR REDUCTION OF SULFUR TRIOXIDE IN FLUE GASES

FIELD OF THE INVENTION

The invention relates to a method for reduction of sulfur trioxide in flue gases.

BACKGROUND OF THE INVENTION

The combustion of sulfur-containing hydrocarbonacous compounds, especially petroleum coke, results in a combustion product gas containing unacceptably high levels of sulfur dioxide and trioxide. Sulfur dioxide is removed through conventional means such as wet scrubbers. However, sulfur trioxide is more difficult to remove, since typically not more than about 50% of the sulfur trioxide is removed in a wet scrubber.

Known methods of removing sulfur trioxide involve passing the product from the wet scrubber to a wet electrostatic precipitator for sulfur trioxide removal. Wet electrostatic precipitators are expensive, however, and add complexity to the process.

A method is needed wherein a wet electrostatic precipitator is not required for sulfur trioxide removal. Such a method is provided by the method of this invention.

SUMMARY OF THE INVENTION

The invention is a method for reduction of sulfur trioxide in flue gases which includes (a) combusting air and fuel in a combustion zone to produce a particulates, sulfur trioxide, and sulfur dioxide-containing combustion product gas;

(b) passing the combustion product gas from step (a) to a dry electrostatic precipitator for removal of particulates and recovering the combustion product gas substantially free of particulates;

(c) admixing particulates with the combustion product gas from step (b), to produce a first mixture;

(d) passing the first mixture from step (c) to an air preheater for cooling the first mixture and heating the air for combustion with the fuel, wherein the sulfur trioxide in the first mixture condenses on the particulates, to produce a second mixture containing combustion product gas containing sulfur trioxide condensed on particulates and sulfur dioxide;

(e) passing the second mixture from step (d) to a wet scrubber for removal of substantially all of the sulfur dioxide, sulfur trioxide, and particulates, to produce a combustion product gas substantially free of sulfur dioxide, sulfur trioxide, and particulates; and (f) passing the combustion product gas substantially free of sulfur dioxide, sulfur trioxide, and particulates from step (e) to a stack for release to the atmosphere.

In an alternate embodiment of the invention, particulates are added to the combustion zone product, then this mixture is cooled in the air preheater, then the air preheater effluent is passed to the dry electrostatic precipitator for removal of the particulates and sulfur trioxide condensed on particulates.

DESCRIPTION OF THE PREFERRED EMBODIMENTS AND DETAILED DESCRIPTION OF THE DRAWINGS

FIG. 1

Figure 1:
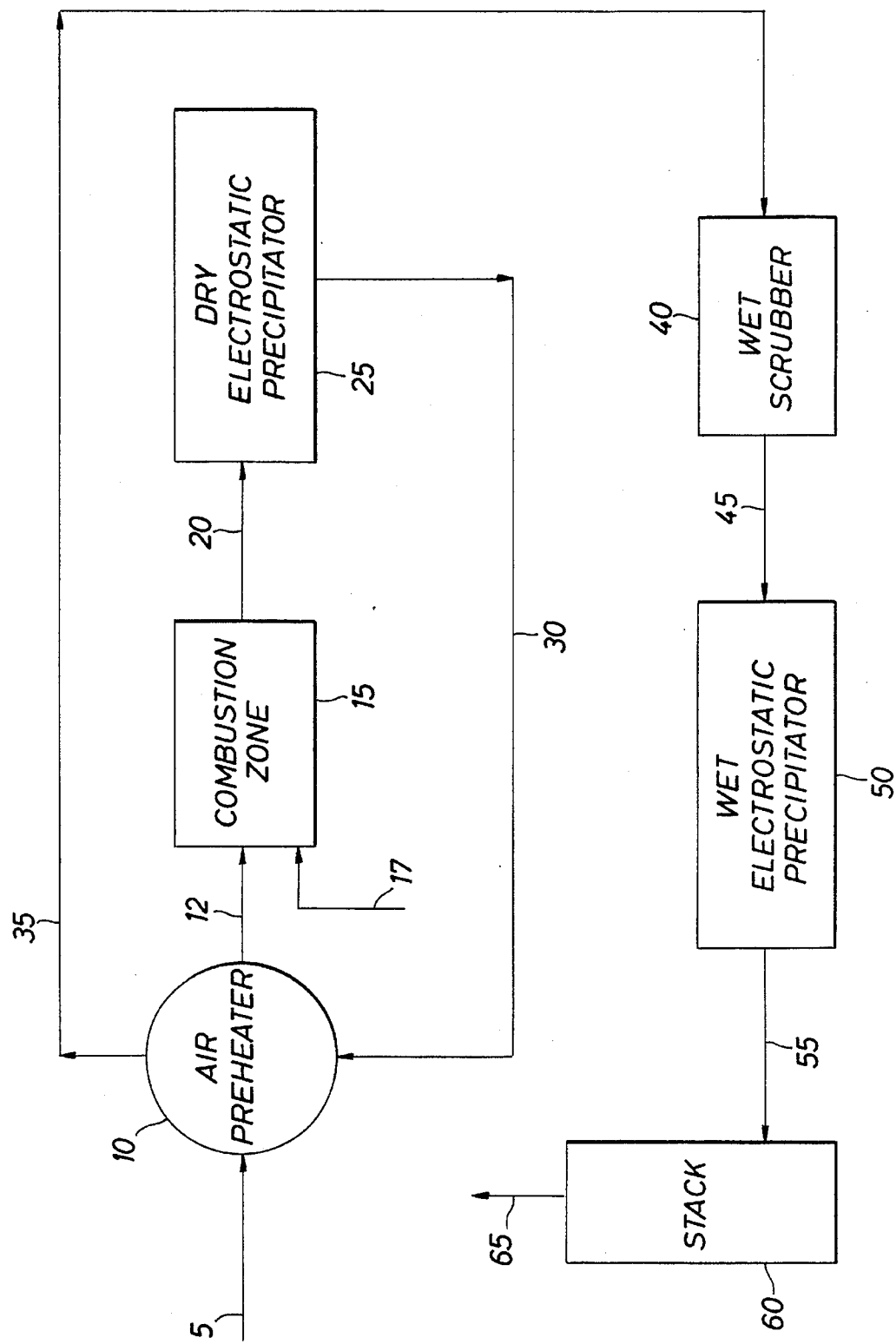
FIG. 1 depicts a schematic of a known process for treating flue gases.

FIG. 1 depicts a schematic of a known process for treating flue gases. Air is fed through line 5 to preheater 10. The air is preheated and then fed to combustion zone 15 along with fuel through line 17. The combustion product passes through line 20 to dry electrostatic precipitator 25 where particulate matter is removed. The particulate matter-free combustion product is then passed in line 30 to air preheater 10 where it serves as a heat source to pre-heat the air from line 5.

As a result of passing through preheater 10 the combustion gases are cooled. These cooled combustion gases pass through line 35 to wet scrubber 40. The sulfur dioxide and part of the sulfur trioxide is removed in wet scrubber 40. The resulting substantially sulfur dioxide-free combustion gases are then passed through line 45 to wet electrostatic precipitator 50 for removal of remaining sulfur trioxide. The resulting combustion gas substantially free of sulfur oxides is passed through line 55 to stack 60 to be passed to the atmosphere through stack exit 65.

FIG. 2

Figure 2:
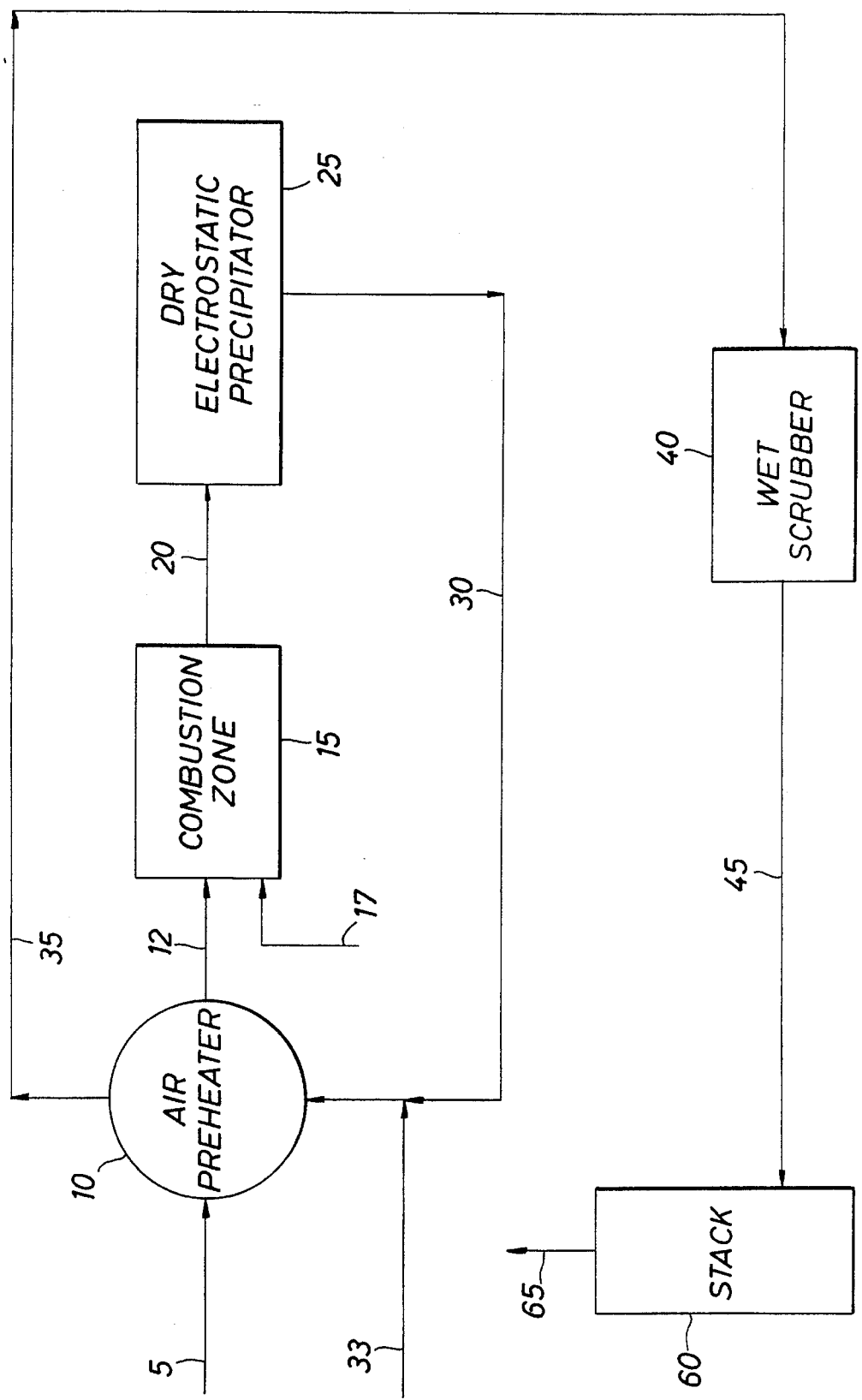
FIG. 2 depicts a schematic of an embodiment of the method of the invention for treating flue gases.

FIG. 2 depicts a schematic of an embodiment of the method of the invention for treating flue gases. The schematic is the same as in FIG. 1 except for the following differences. Wet electrostatic precipitator 50 is not present and particle line 33 is added. In the method of the invention, the particulate fed through line 33, for admixture with particulate matter-free combustion product, is entrained in the air preheater. As sulfur trioxide in the air preheater cools below its condensation point, it condenses on the particulates entrained in the air preheater. Where the particulates contain calcium carbonate such as where the particulates are limestone the condensed sulfur trioxide reacts with the calcium carbonate to form calcium sulfate as indicated in reaction 1 below.

$$SO_3 + CaCO_3 = CaSO_4 + CO_2 \tag{1}$$

The condensed sulfur trioxide will react with the calcium carbonate in the wet limestone scrubber. Where the particulates contain calcium carbonate, such as limestone particulates, the calcium sulfate formed is in a solid particulate form and will be entrained in wet scrubber 40. The combustion gases passing through line 45 from the wet scrubber are substantially free of sulfur dioxide and sulfur trioxide. Thus, the need for a wet electrostatic precipitator is eliminated.

FIG. 3

Figure 3:
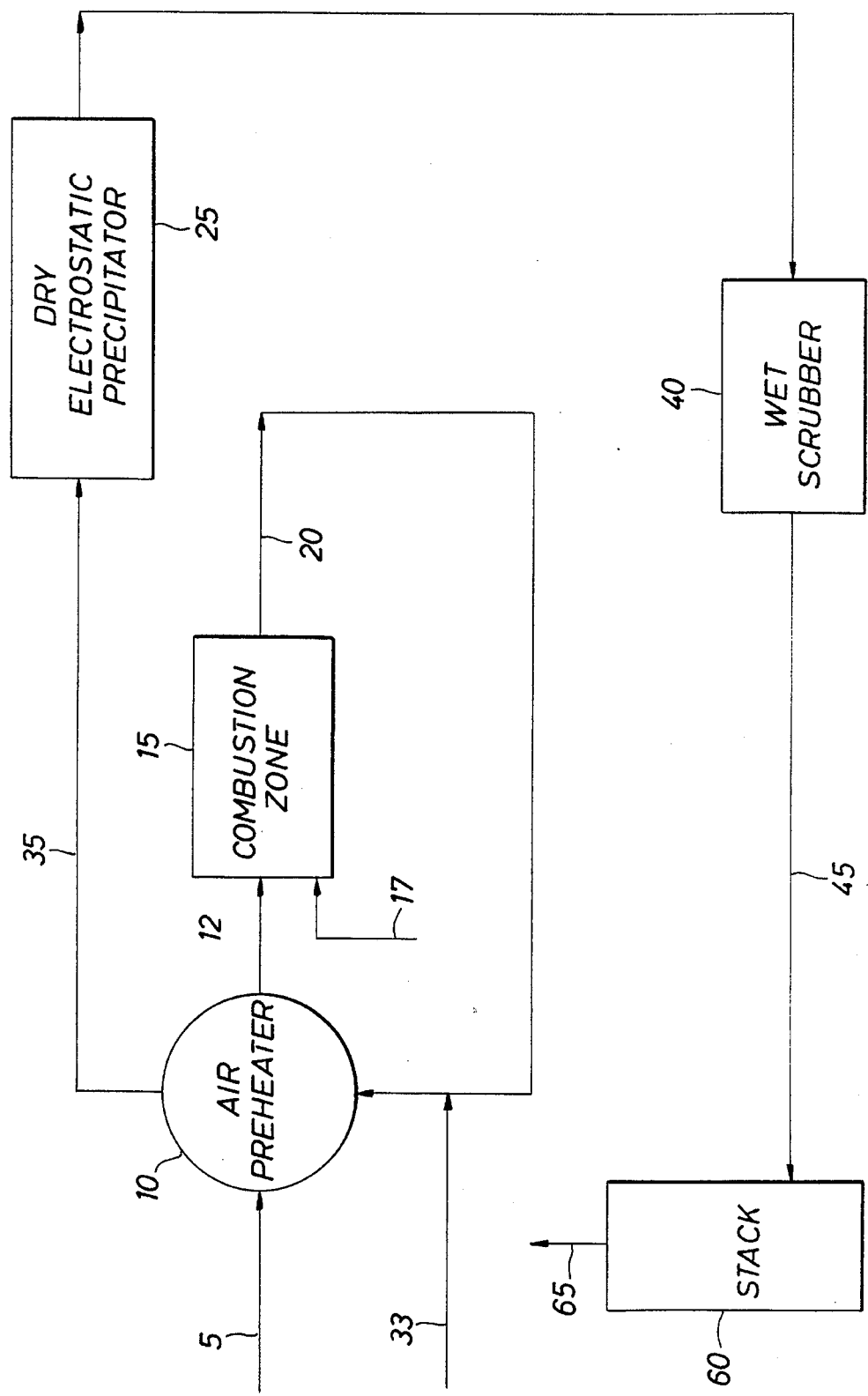
FIG. 3 depicts a schematic of an alternative embodiment of the invention where the dry electrostatic precipitator is after the preheater.

An alternate embodiment of the invention is depicted in FIG. 3. In this embodiment the order of steps is rearranged so that the particulates (in line 33) are added to the combustion zone product (in line 20) before the combustion product gas passes through dry electrostatic precipitator 25. This mixture is then cooled in air preheater 10. The air preheater effluent is then passed to dry electrostatic precipitator 25.

PROCESS CONDITIONS/VARIABLES

The particulates for admixing with the combustion product gas are any particulates on which sulfur trioxide will condense and which do not cause any environmental or corrosion problems. Various types of ash are suitable particulates such as is obtained from coal-fired or coke-fired furnaces. Preferably, the particulates are calcium-carbonate containing particles. More preferably, the particulates are limestone. Smaller powder-type particulates are preferable over larger granular particulates since smaller particulates offer more surface area for the sulfur trioxide to condense upon.

Wet scrubber 40 is preferably a wet limestone scrubber. The combustion zone is typically a furnace. The temperature of said first mixture when it enters the air preheater will vary with the combustion zone conditions. Typically, however, it is from about 500° F. to about 1000° F., preferably from about 600° F. to about 800° F. The first mixture is cooled in the air preheater to a temperature at which at least a portion, and preferably substantially all, of the sulfur trioxide condenses on the particulates. This temperature will vary depending on the concentration of sulfur trioxide. Typically, however, the temperature is from below about 400° F. for relatively high sulfur trioxide concentrations, and below about 350° F. for lower sulfur trioxide concentrations. The lower limit is 212° F. since this is the point at water will condense and water condensation is undesirable. The cooling of the combustion product gas is essential to the method of this invention since the sulfur trioxide will not condense until it is sufficiently cooled. In the embodiment where the condensed sulfur trioxide is removed in the wet limestone scrubber, only the condensed sulfur trioxide will react with the calcium carbonate to form calcium sulfate.

What is claimed is:

1. A method for reduction of sulfur trioxide in flue gases consisting essentially of
   (a) combusting air and petroleum coke in a combustion zone thereby producing a particulates, sulfur trioxide, and sulfur dioxide-containing combustion product gas;
   (b) admixing ash particulates from coke-fired furnaces on which sulfur trioxide will condense with said combustion product gas from step (a), thereby producing a first mixture;
   (c) passing said first mixture from step (b) to an air preheater for cooling said first mixture to a temperature from above 212° F. to below 400° F. and heating said air for combustion with said petroleum coke, wherein said sulfur trioxide in said first mixture condenses, thereby forming a condensate on said particulates, thereby producing a second mixture containing combustion product gas containing condensate on particulates and sulfur dioxide;
   (d) passing said second mixture from step (c) to a dry electrostatic precipitator for removal of a sufficient portion of said particulates to produce a combustion product gas substantially free of particulates; and recovering said combustion product gas substantially free of particulates;
   (e) passing said second mixture from step (d) to a wet scrubber for removal of substantially all of said sulfur dioxide, thereby producing a combustion product gas substantially free of sulfur dioxide, sulfur trioxide, and particulates; and
   (f) passing said combustion product gas substantially free of sulfur dioxide, sulfur trioxide, and particulates from step (e) to a stack for release to the atmosphere.

2. The method according to claim 1 wherein said first mixture enters said air preheater at a temperature from 500° F. to 1000° F.

3. The method according to claim 1 wherein said particulates consist of ash.

4. The method according to claim 3 wherein said wet scrubber contains limestone for reaction with said sulfur dioxide.

5. The method according to claim 3 wherein said first mixture enters said air preheater at a temperature from 600° F. to 800° F.

6. The method according to claim 5 wherein said first mixture is cooled in said air preheater to a temperature from above 212° F. to below 350° F.

7. A method for reduction of sulfur trioxide in flue gases consisting essentially of
   (a) combusting air and petroleum-coke in a petroleum-coke fired furnace thereby producing a particulates, sulfur trioxide, and sulfur dioxide-containing combustion product gas;
   (b) passing said combustion product gas from step (a) to a dry electrostatic precipitator for removal of particulates and recovering said combustion product gas substantially free of particulates;
   (c) admixing ash particulates from a coke-fired furnace on which sulfur trioxide will condense with said combustion product gas from step (b), thereby producing a first mixture;
   (d) passing said first mixture from step (c) to an air preheater for cooling said combustion product gas substantially free of particulates to a temperature from above 212° F. to below 400° F., and heating said air for combustion with said petroleum coke, wherein substantially all of said sulfur trioxide in said combustion product gas substantially free of particulates condenses, thereby forming a condensate on said particulates, thereby producing a second mixture containing combustion product gas containing particulates having condensate thereon, sulfur dioxide, and substantially free of uncondensed sulfur trioxide;
   (e) passing said second mixture from step (d) to a wet limestone scrubber for removal by reaction of substantially all of said sulfur dioxide and removal by entrainment of substantially all of said particulates having condensate thereon, thereby producing a combustion product gas substantially free of sulfur dioxide, sulfur trioxide, and calcium sulfate; and
   (f) passing said combustion product gas substantially free of sulfur dioxide, sulfur trioxide, and calcium sulfate from step (e) to a stack for release to the atmosphere.

8. The method according to claim 7 wherein said first mixture from step (c) enters said air preheater at a temperature from 500° F. to 1000° F.

9. The method according to claim 8 wherein said first mixture from step (c) enters said air preheater at a temperature from 600° F. to 800° F.

10. The method according to claim 9 wherein said first mixture is cooled in said air preheater to a temperature from above 212° F. to below 350° F.

11. A method for reduction of sulfur trioxide in flue gases consisting essentially of
    (a) combusting air and petroleum coke in a petroleum-coke fired furnace thereby producing a particulates, sulfur trioxide, and sulfur dioxide-containing combustion product gas;

(b) admixing limestone particulates with said combustion product gas from step (a), thereby producing a first mixture;

(c) passing said first mixture from step (b) at a temperature from 500° F. to 1000° F. to an air preheater for cooling said first mixture to a temperature from above 212° F. to below 400° F. and heating said air for combustion with said petroleum coke, wherein said sulfur trioxide in said first mixture condenses, thereby forming a condensate on said particulates, thereby producing a second mixture containing combustion product gas containing ash particulates having condensate thereon, sulfur dioxide, and substantially free of sulfur trioxide;

(d) passing said second mixture from step (c) to a dry electrostatic precipitator for removal of particulates and recovering said combustion product gas substantially free of particulates;

(e) passing said combustion product gas substantially free of particulates from step (d) to a wet limestone scrubber for removal of substantially all of said sulfur dioxide, thereby producing a combustion product gas substantially free of sulfur dioxide, sulfur trioxide, and calcium sulfate; and (f) passing said combustion product gas substantially free of sulfur dioxide, sulfur trioxide, and calcium sulfate from step (e) to a stack for release to the atmosphere.

12. The method according to claim 11 wherein said first mixture enters said air preheater at a temperature from 600° F. to 800° F.

13. The method according to claim 12 wherein said first mixture is cooled in said air preheater to a temperature from above 212° F. to 350° F.

* * * * *